(12) United States Patent
Yano et al.

(10) Patent No.: US 6,572,048 B2
(45) Date of Patent: Jun. 3, 2003

(54) SEAT BELT RETRACTOR WITH DOUBLE RETRACTION SYSTEM

(75) Inventors: Ryuji Yano, Tokyo (JP); Hiroaki Fujii, Tokyo (JP)

(73) Assignee: Takata Corporation, Tokyo (JP)

( * ) Notice: Subject to any disclaimer, the term of this patent is extended or adjusted under 35 U.S.C. 154(b) by 70 days.

(21) Appl. No.: 09/734,049

(22) Filed: Dec. 12, 2000

(65) Prior Publication Data
US 2001/0004997 A1 Jun. 28, 2001

(30) Foreign Application Priority Data
Dec. 13, 1999 (JP) .......................... 11-352973

(51) Int. Cl.[7] ............................... B65H 75/48
(52) U.S. Cl. .............. 242/390.8; 242/390.9; 242/288.06; 297/478
(58) Field of Search ............... 242/390.8, 390.9, 242/288.06; 297/478

(56) References Cited

U.S. PATENT DOCUMENTS 5,558,370 A * 9/1996 Behr ................... 280/806
2001/0017330 A1 * 8/2001 Fuji et al. ............. 242/390.8

* cited by examiner

Primary Examiner—Donald P. Walsh
Assistant Examiner—Jonathan R Miller
(74) Attorney, Agent, or Firm—Kanasaka & Takeuchi

(57) ABSTRACT

A seat belt retractor for retracting a seat belt is formed of a first motor for retracting a seat belt with a force not providing a pressing feeling to a passenger, a second motor having a torque greater than that of the first motor for retracting the seat belt with a force forcibly holding the passenger to a seat, and a control circuit connected to the first and second motors for controlling the same. Thus, the seat belt retractor can perform a forced retraction and a normal retraction with an economical structure.

9 Claims, 4 Drawing Sheets

SEAT BELT RETRACTOR WITH DOUBLE RETRACTION SYSTEM

BACKGROUND OF THE INVENTION AND RELATED ART STATEMENT

The invention relates to a seat belt retractor having a function of retracting a seat belt by a motor.

In a seat belt to be used in a vehicle or automobile, a tension is applied by a seat belt retractor. In other words, in case the seat belt is used, one end of a seat belt wound by a spring in the seat belt retractor is drawn out by a passenger and engaged with another side of the seat belt fixed to a seat through a buckle. Thereafter, when the passenger releases the hands from the seat belt, the loosened seat belt is wound up by an action of the spring in the seat belt retractor, and a tension determined by the spring is provided to the seat belt to thereby hold the passenger to the seat.

However, in such a spring-type retracting mechanism, since a force is applied only in a seat belt tightening direction, in case the passenger tries to loosen the seat belt, the passenger has to pull out the seat belt against the force. Also, since an elasticity of the spring is used in retracting the seat belt, the operation is unstable, which may result in a poor seat-belt retraction.

To solve the above problems, there has been proposed a seat belt retractor, wherein a seat belt is wound by a motor. More specifically, an engagement of a buckle and a tongue plate fixed to the seat belt is electrically detected, and in case a disengagement thereof is detected, the seat belt is wound by a motor. In other words, while the buckle and the tongue are engaged with each other, it is assumed that the passenger wears the seat belt, so that retraction of the seat belt is not carried out by the motor and is carried out by a spring with a weak force. In some cases, the seat belt may be retracted only by a motor with a weak retracting force without using the spring.

However, when the seat belt is in an operating condition, in addition to the normal operation, there may be a situation wherein the seat belt has to be retracted with a larger torque than normal. For example, in case a collision is detected beforehand, it is required that the looseness of the belt is quickly wound up and the passenger is held to a seat with a stronger force than normal. Also, in case a child seat is fixed to a seat by the seat belt, it is necessary to firmly fix the child seat with a stronger force than that required for holding the passenger to thereby require a large torque. In the present specification, this type of retracting condition is called as a "forced retraction" and is distinguished from a "normal retraction".

In case the forced retraction and the normal retraction are carried out by one motor, a torque control and a speed control of the motor have to be performed. An example thereof is shown in FIG. 4. Though not shown, a motor M is connected to a seat belt retractor, and the seat belt is wound or unwound through rotation of the motor M.

Control pulses P1–P4 are outputted from a central processing unit (hereinafter referred to as "CPU") and are provided to gates of switching transistors Q1–Q4 which are switching elements as P1'–P4' through a gate circuit GATE. On the other hand, a voltage from a direct current (hereinafter referred to as "DC") power source is connected to collectors of the switching transistors Q1, Q2; a motor terminal A is connected to an emitter of the transistor Q1 and a collector of the transistor Q4; and a motor terminal B is connected to an emitter of the transistor Q2 and a collector of the transistor Q3. Further, emitters of the switching transistors Q3, Q4 are grounded.

When the buckle of the seat belt is engaged with the tongue plate, and external information, such as a rotating direction and rotating speed of the motor M, is inputted, the CPU outputs control pulses P1–P4 corresponding thereto. A rotating direction of the motor M is determined by the on/off operation of the control pulses P1–P4, and a rotating speed of the motor M can be changed by varying duty ratio of the control pulses.

Incidentally, in FIG. 4, a thermistor TH is provided to monitor a temperature of the motor M, and when the temperature of the motor M is raised due to an overload thereof, the information thereof is inputted into the CPU to stop driving of the motor M. A flywheel diode connected parallel to the motor M is omitted in the drawing.

As described hereinabove, according to the circuit shown in FIG. 4, since the seat belt can be driven at a necessary speed and in a necessary direction, the forced retraction and normal retraction can be made by one motor. However, in that case, the normal retraction is carried out with a small duty ratio, which results in a poor control ability. In reality, in case the normal retraction is carried out, the duty ratio thereof should be set with a certain larger number, and switching transistors having smaller capacities for that duty ratio may be used. However, when the forced retraction is also carried out by the switching circuit, switching transistors having larger capacities are required, which results in a high cost of the circuit.

Also, in case rotation of the motor is controlled by the duty ratio, i.e. a pulse width, a high-cost switching circuit, i.e. speed control circuit, is required, and at the same time, noises are generated from the switching circuit and the control circuit. To prevent the noises from entering a power source circuit, a filter circuit with a large capacity is required, which results in a high cost of the entire device.

In view of the above problems, the present invention has been made, and an object of the invention is to provide a seat belt retractor, wherein a forced retraction and normal retraction can be carried out with an economical structure without requiring a filter with a large capacity.

Another object of the invention is to provide a seat belt retractor as stated above, wherein the normal retraction can be carried out easily through a logic circuit, the forced retraction can be carried out by a simple circuit and operation can be firmly done.

Further objects and advantages of the invention will be apparent from the following description of the invention.

SUMMARY OF THE INVENTION

In order to attain the above objects, according to a first aspect of the invention, a seat belt retractor having a function for retracting a seat belt by motors includes a first motor for retracting the seat belt with a force not providing a pressing feeling to a passenger, and a second motor for retracting the seat belt with a force strongly holding the passenger to a seat, and these two motors are controlled by a control circuit.

In the first aspect, a normal retracting motor, i.e. the first motor, and a forced retracting motor, i.e. the second motor, are separated to simplify the control circuit. In other words, since a speed control and a torque control are not required to be carried out in the control circuit, the control circuit is simplified, and at the same time, noises generated according to switching can be removed. Thus, a filter for preventing the noises from entering a power source is not required, or even if required, its size is small. Through control of the single control circuit, the respective motors can move without inconsistency.

According to a second aspect of the invention to attain the above objects, in the first aspect, the first motor is controlled through a logic circuit formed of a microcomputer or a semiconductor circuit, and the second motor is directly driven through a switching circuit controlled by an external signal not through the logic circuit formed of the microcomputer or the semiconductor circuit.

In the motor for carrying out the normal retraction, in addition to a situation such that a retraction is carried out under disengagement of a buckle and a tongue plate, for example, when it is detected that the passenger gets off, i.e. no passenger is in the automobile, a logic for carrying out re-retracting may be added. It is preferable to easily change the logic. Thus, the control of the first motor is carried out through the logic circuit formed of the microcomputer or semiconductor circuit.

On the other hand, it is preferable that the motor for carrying out the forced retraction is directly driven by a simpler circuit since it is required to operate at an emergency time such that a collision is expected. Thus, in the second aspect, the forced retraction is directly made through the switching circuit controlled by the external signal.

According to a third aspect of the invention to attain the above objects, in the first or second aspect, there is provided an interlock so that a power is not supplied to the first and second motors simultaneously.

In considering an unusual combination in a logic circuit, according to a combination in a logic circuit, it is undeniable that the first motor and second motor are simultaneously rotated in the opposite directions. When such a situation takes place, a retracting force in the forced retraction may be weakened. Also, in case an inspection work is carried out, there may be formed a forced retraction condition, and the forced retracting motor is driven. Thus, in the present aspect, there is provided an interlock for not supplying powers to the first motor and the second motor simultaneously to prevent such a situation.

According to a fourth aspect of the invention to attain the above objects, in the third aspect, the interlock is carried out by a circuit for not providing power to the second motor by an output from the microcomputer or semiconductor circuit for controlling the first motor.

In the fourth aspect, the interlock for not providing the power to the second motor is carried out by the output from the microcomputer or semiconductor circuit for controlling the first motor. Thus, the interlock for not providing the power of the second motor can be formed by a combination of complicated conditions.

DETAILED DESCRIPTION OF PREFERRED EMBODIMENTS

Figure 1:
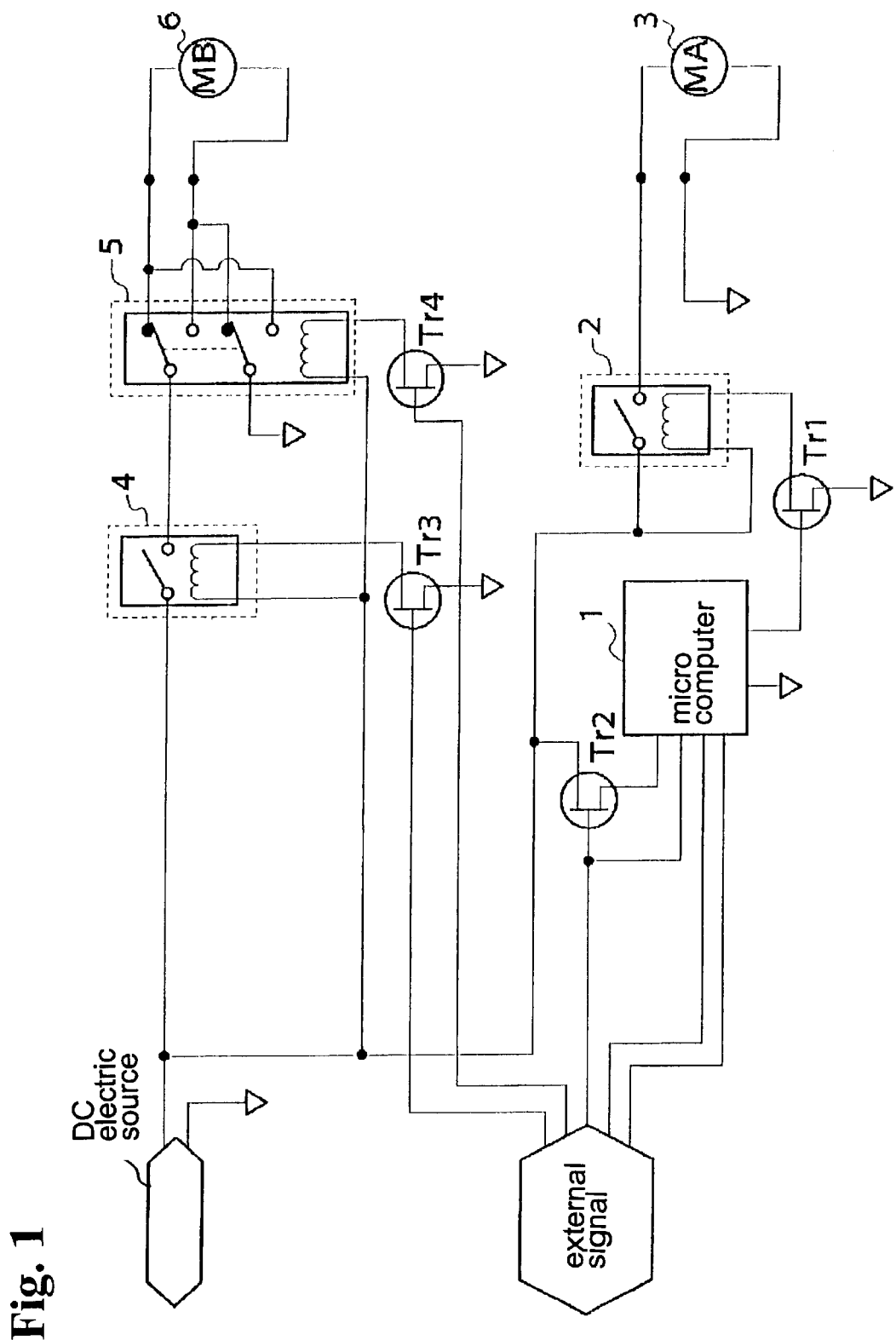
FIG. 1 is a schematic circuit diagram showing a first embodiment of a seat belt retractor according to the present invention.

Hereunder, embodiments of a seat belt retractor according to the invention are explained with reference to the accompanying drawings. FIG. 1 is a schematic circuit diagram showing a first embodiment of the invention. In FIG. 1, reference numeral 1 represents a microcomputer for controlling a motor, 2 is a relay, 3 is a first motor, 4 and 5 are relays, 6 is a second motor, $Tr_1$–$Tr_4$ are transistors. The first motor 3 is a normal retraction motor for retracting a seat belt with a force which does not give any pressed feeling to a passenger. The second motor 6 is a motor for forced retraction, and is used for holding the passenger to a seat at an emergency time or holding a child seat to the seat.

At a normal time, for example, in case it is detected that a buckle and a tongue plate of the seat belt are engaged with each other or that the buckle and the tongue plate are disengaged from each other, the information is provided to the motor controlling microcomputer 1 as an external signal. When the motor controlling microcomputer 1, with reference to other conditions, decides that it is necessary to retract the seat belt, the transistor $Tr_1$ is turned on for a predetermined time. Accordingly, a contact point of the relay 2 is closed, so that a voltage from a DC power source is applied to the first motor 3 and the first motor 3 is rotated with a predetermined torque to thereby retract the seat belt. The transistor $Tr_2$ is turned off by the external signal when, for example, an engine key is pulled out or no passenger is in a car, so that supply of power to the motor controlling microcomputer 1 is shut off to prevent a battery from wasting power.

In case an unusual situation, such as a collision, is predicted beforehand by detection of an excessive deceleration by an acceleration sensor provided to a car, a transistor $Tr_3$ is turned on by the external signal, but the transistor $Tr_4$ remains off. Then, a contact point of the relay 4 is closed, and a voltage is applied to the second motor 6 from the DC power source through the relays 4, 5, so that the second motor 6 is subjected to a normal rotation by a large torque to retract the seat belt.

For some reason, in case the seat belt is desired to be unwound by the motor, the transistors $Tr_3$ and $Tr_4$ are turned on together by the external signal. Then, since the connection of the contact point of the relay 5 is switched, a voltage is applied in a direction for allowing the second motor 6 to make a reverse rotation from the DC power source through the relays 4, 5, so that the second motor 6 is reversely rotated to thereby unwind the seat belt.

In the circuit, since a speed control of the motor is not carried out, in other words, a pulse width modulation (hereinafter referred to as "PWM") circuit or like is not used, a structure of the circuit becomes simple and noises are prevented from entering the power source to thereby not require any large filter. The effect is applied to other embodiments described hereunder.

Figure 2:
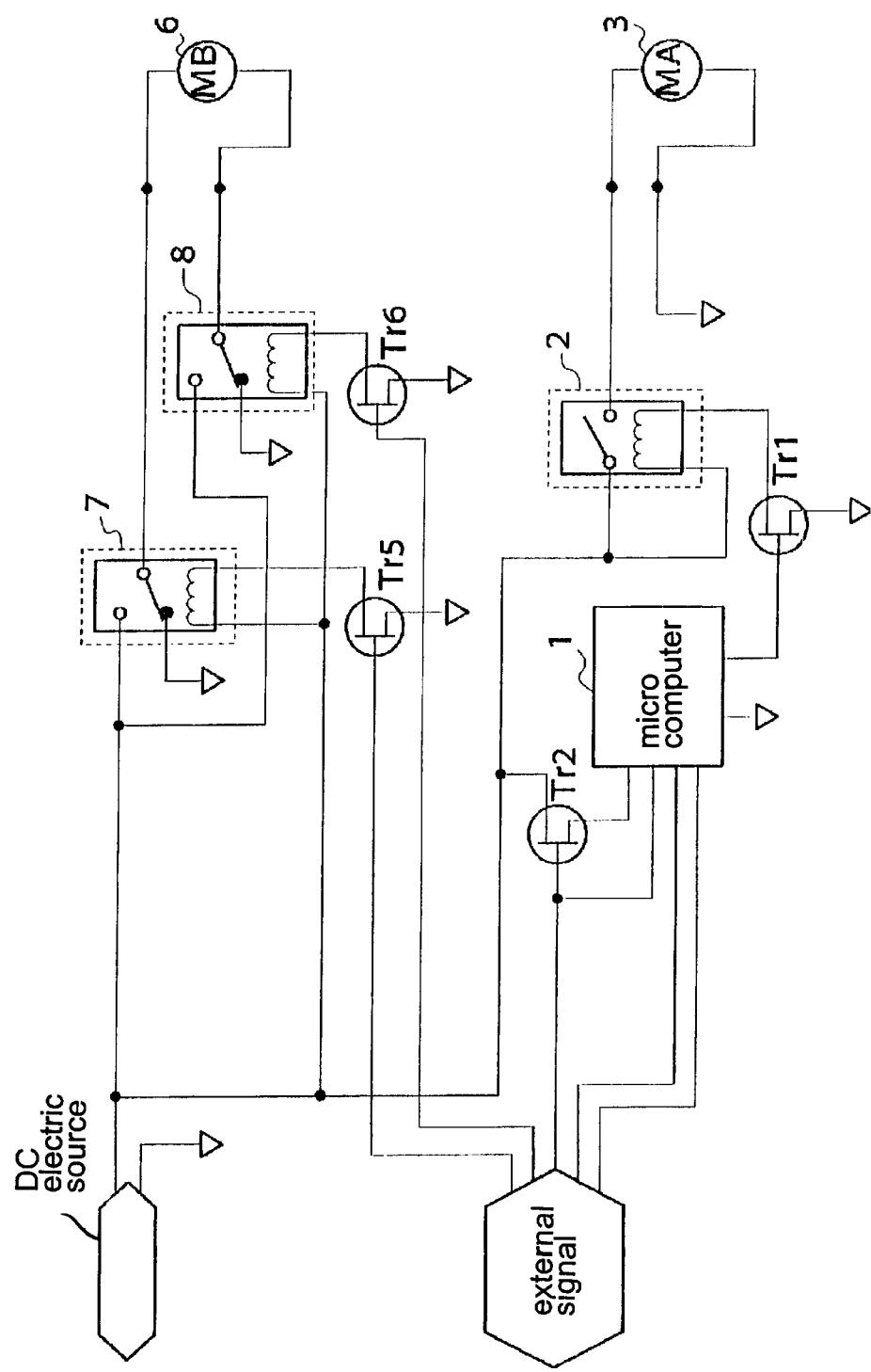
FIG. 2 is a schematic circuit diagram showing a second embodiment of a seat belt retractor according to the present invention.

FIG. 2 is a schematic circuit diagram showing a second embodiment according to the present invention. In the drawings referred to hereunder, the constituting elements of the first embodiment as shown in FIG. 1 are represented by the same symbols and explanations thereof are omitted. In FIG. 2, reference numerals 7, 8 are relays, and $Tr_5$, $Tr_6$ are transistors.

Since a control circuit for a first motor 1 is the same as that shown in FIG. 1, its explanation is omitted. In case an unusual situation, such as a collision, is predicted beforehand by the detection of an excessive deceleration by an acceleration sensor provided to a car, the transistor $Tr_5$ is turned on by an external signal but the transistor $Tr_6$ remains off. Then, a contact point of the relay 7 is connected to a DC power source, and a voltage is applied to one terminal of the second motor 6 from the DC power source through the relay 7. Since a contact point of the relay 8 is connected to an earth side, an electric power is supplied to the second motor 6 from the DC power source and the second motor 6 is subjected to a normal rotation with a large torque to retract the seat belt.

For some reason, in case the seat belt is desired to be unwound by the motor, the transistors $Tr_6$ is turned on by an external signal but the transistor $TR_5$ remains off. Thus, a contact point of the relay 8 is connected to the DC power source and a voltage is applied to one terminal of the second motor 6 from the DC power source. Since a contact point of the relay 7 is connected to an earth side, an electric power is supplied to the second motor from the DC power source, and the second motor 6 is subjected to a reverse rotation to thereby unwind the seat belt.

For some reason, if an input for subjecting the second motor 6 to a normal rotation and an input for subjecting the second motor 6 to a reverse rotation are simultaneously applied, since the contact points of the relay 7 and relay 8 are connected to the side of the DC power source, the second motor 6 does not rotate to thereby prevent a dangerous state. The circuit including the relays 7, 8 constitutes the interlock.

Figure 3:
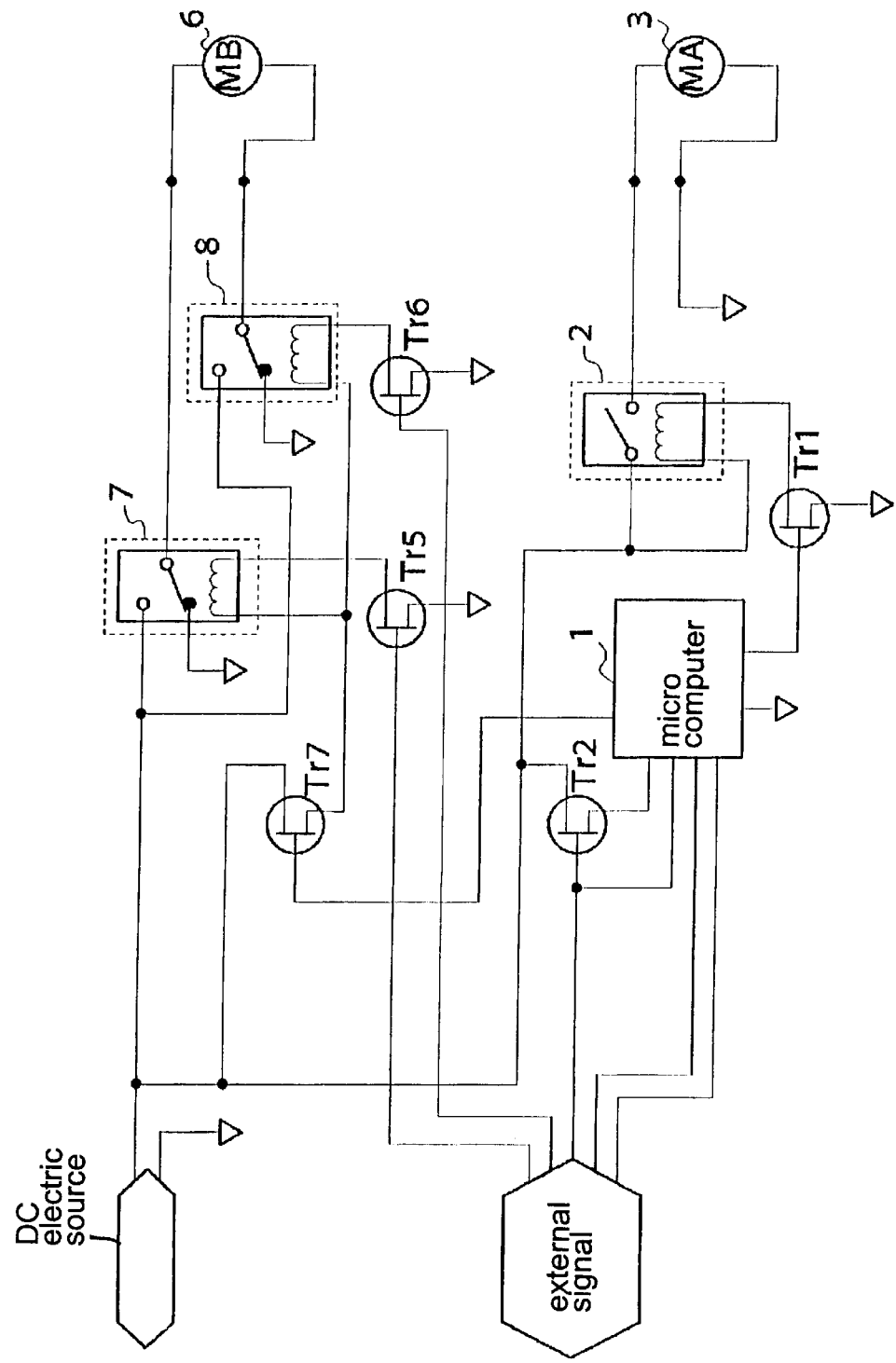
FIG. 3 is a schematic circuit diagram showing a third embodiment of a seat belt retractor according to the present invention.
Figure 4:
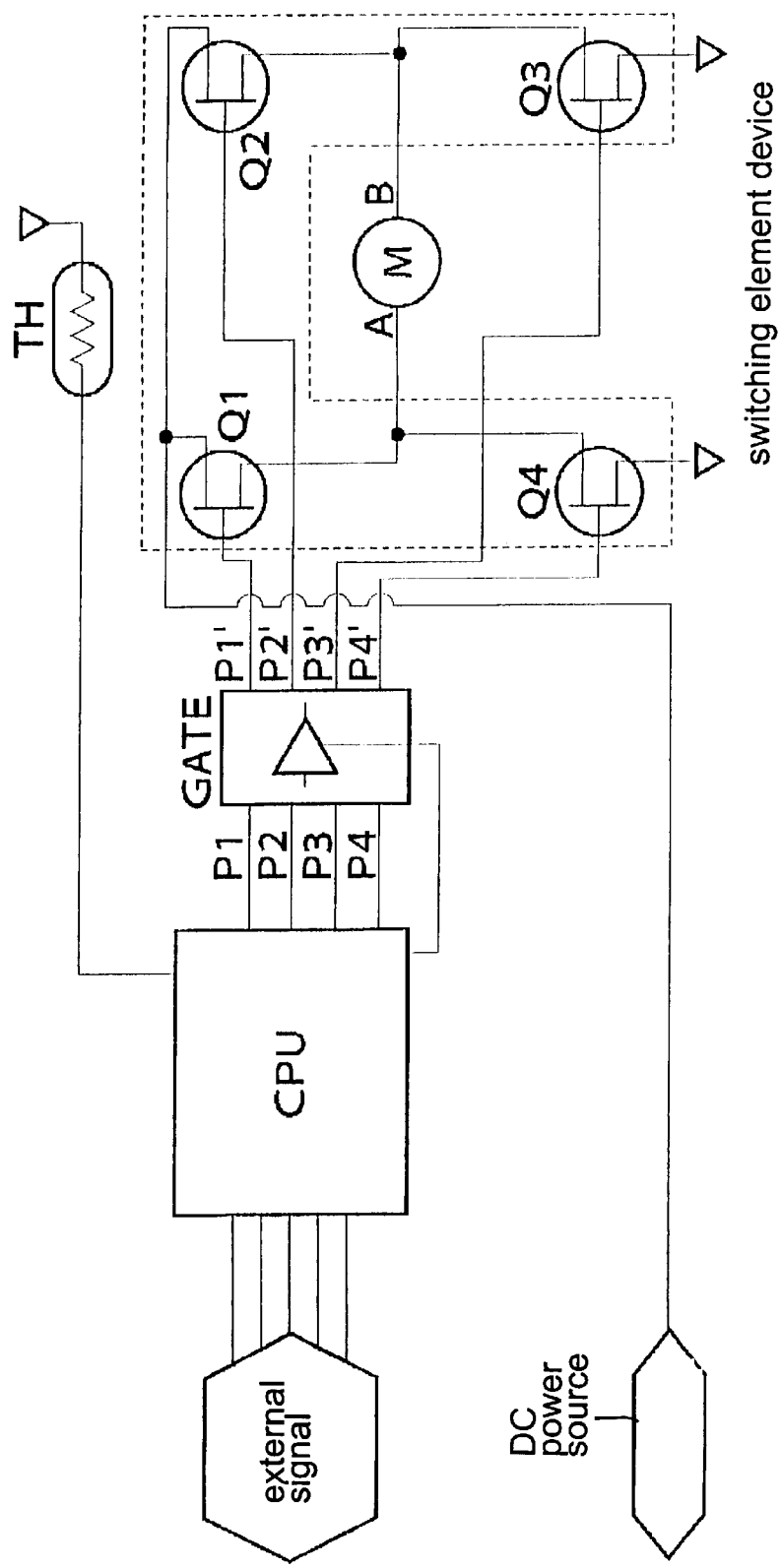
FIG. 4 is a schematic circuit diagram wherein a forced retraction and a normal retraction are carried out by one motor.

FIG. 3 is a schematic circuit diagram showing a third embodiment according to the present invention. In FIG. 3, $Tr_7$ is a transistor. Since a control circuit shown in FIG. 3 is different from that shown in FIG. 2 in that there is provided the transistor $Tr_7$, through which the DC power from the power source is supplied to coils of the relays 7, 8. Thus, only these portions are explained.

For example, in case only a driver sits on a driver's seat and there is no passenger on a passenger's seat, a forced retraction is carried out only for the driver's seat. In this case, with respect to the passenger's seat, the transistor $Tr_7$ is turned off by an output of the motor control microcomputer 1 to thereby not operate the relays 7, 8. Thus, even if an external signal is inputted, the second motor 6 can not be operated. In addition to this, while the first motor 3 is operating, the transistor $Tr_7$ is turned off by an output of the motor control microcomputer 1, so that the second motor 6 can not be operated, neither. Conversely, not shown, while the second motor 6 is rotating, the first motor 3 can be controlled not to rotate. To constitute such a circuit is easy for a person skilled in the art and does not require any explanation.

As explained hereinabove, according to the first aspect of the invention, since it is not required to carry out a speed control and torque control in a control circuit, the control circuit becomes simple, and at the same time, noises generated by switching are suppressed. Thus, a filter for preventing the noises from entering the power source is not required, or if required, its size can be small.

According to the second aspect of the invention, the normal retraction can be simply done, or change of the logic can be simply done. With respect to the forced retraction, an operation can be securely carried out with a simple circuit.

According to the third aspect of the invention, the motor for the forced retraction and the motor for the normal retraction are prevented from being simultaneously rotated.

According to the fourth aspect of the invention, the interlock for preventing the power for the forced retraction motor from being supplied can be carried out by a combination of complicated conditions.

While the invention has been explained with reference to the specific embodiments of the invention, the explanation is illustrative and the invention is limited only by the appended claims.

What is claimed is:

1. A seat belt retractor for retracting a seat belt, comprising:
   a first electric motor for retracting a seat belt with a first force,
   a second electric motor having a torque greater than a torque of the first motor for retracting the seat belt with a second force eater than the first force, said second electric motor being reversible, and
   a control circuit connected to the first and second electric motors for controlling the first and second electric motors.

2. A seat belt retractor according to claim 1, further comprising an external signal device for providing external signals to the control circuit, said control circuit including a logic circuit formed of one of a microcomputer and a semiconductor circuit, and a switching circuit controlled by the external signals, said first motor being controlled through the logic circuit and said second motor being directly controlled through the switching circuit by the external signal without the logic circuit.

3. A seat belt retractor according to claim 2, wherein said control circuit further includes a first relay connected to the first motor and operated by the logic circuit, and said switching circuit includes a second relay connected to the second motor and operated by the external signal.

4. A seat belt retractor according to claim 3, wherein said switching circuit further includes a third relay, said second and third relays being connected so that when the second relay is actuated, the second motor rotates in a seat belt winding direction, and when the second and third relays are actuated, the second motor rotates in a seat belt unwinding direction.

5. A seat belt retractor according to claim 3, wherein said switching circuit further includes a third relay, said second and third relays being connected so that when the second relay is actuated, the second motor rotates in a seat belt winding direction; when the third relay is actuated, the second motor rotates in a seat belt unwinding direction; and when the second and third relays are actuated, the second motor does not rotate.

6. A seat belt retractor for retracting a seat belt, comprising:
   a first motor for retracting a seat belt with a first force,
   a second motor having a torque greater than a torque of the first motor for retracting the seat belt with a second force greater than the first force, and
   a control circuit connected to the first and second motors for controlling the first and second motors, and having an interlock so that the first and second motors are not provided with power simultaneously.

7. A seat belt retractor according to claim 6, wherein said interlock includes a circuit actuated by the control circuit for controlling the first motor so that a power to the second motor is not supplied.

8. A seat belt retractor according to claim 7, wherein said second motor is not operated when the interlock is actuated by the control circuit.

9. A seat belt retractor according to claim 1, wherein said second electric motor rotates in a seat belt winding direction to quickly retract the seat belt in an emergency situation, and rotates in a seat belt unwinding direction to withdraw the seat belt if required.

* * * * *